(12) United States Patent
Corey et al.

(10) Patent No.: US 10,556,820 B2
(45) Date of Patent: Feb. 11, 2020

(54) METHOD FOR MAKING AN OPTICAL FIBER DEVICE FROM A 3D PRINTED PREFORM BODY AND RELATED STRUCTURES

(71) Applicant: Harris Corporation, Melbourne, FL (US)

(72) Inventors: Christopher A. Corey, Palm Bay, FL (US); Susanne M. Lee, Cocoa, FL (US)

(73) Assignee: HARRIS CORPORATION, Melbourne, FL (US)

( * ) Notice: Subject to any disclaimer, the term of this patent is extended or adjusted under 35 U.S.C. 154(b) by 211 days.

(21) Appl. No.: 15/672,369

(22) Filed: Aug. 9, 2017

(65) Prior Publication Data

US 2019/0047896 A1    Feb. 14, 2019

(51) Int. Cl.
| | |
|---|---|
| *C03B 37/012* | (2006.01) |
| *C03B 37/026* | (2006.01) |
| *C25D 3/48* | (2006.01) |
| *C25D 5/54* | (2006.01) |
| *C25D 7/00* | (2006.01) |
| *C03C 25/106* | (2018.01) |
| *B33Y 30/00* | (2015.01) |
| *C03B 37/027* | (2006.01) |
| *G02B 6/02* | (2006.01) |

(52) U.S. Cl.
CPC ............ *C03B 37/012* (2013.01); *B33Y 30/00* (2014.12); *C03B 37/026* (2013.01); *C03B 37/0279* (2013.01); *C03B 37/02781* (2013.01); *C03C 25/1063* (2018.01); *C25D 3/48* (2013.01); *C25D 5/54* (2013.01); *C25D 7/00* (2013.01); *G02B 6/02314* (2013.01); *C03B 2203/16* (2013.01); *C03B 2203/20* (2013.01); *C03B 2203/32* (2013.01); *C03B 2205/12* (2013.01); *C03B 2205/42* (2013.01); *G02B 6/02* (2013.01)

(58) Field of Classification Search
None
See application file for complete search history.

(56) References Cited

U.S. PATENT DOCUMENTS

| | | | |
|---|---|---|---|
| 4,929,402 | A | 5/1990 | Hull |
| 6,154,594 | A | 11/2000 | Fiacco et al. |
| 7,209,616 | B2 | 4/2007 | Welker et al. |
| 2002/0118937 | A1 | 8/2002 | Broderick et al. |

(Continued)

FOREIGN PATENT DOCUMENTS

CN      201510793040      3/2016

OTHER PUBLICATIONS

Low et al. "Perspective on 3D printing of separation membranes and comparison to related unconventional fabrication techniques" Journal of Membrane Science 523 (2017) pp. 596-613.

(Continued)

*Primary Examiner* — Lisa L Herring
(74) *Attorney, Agent, or Firm* — Allen, Dyer, Doppelt + Gilchrist, P.A.

(57) ABSTRACT

A method for making an optical fiber device may include using a three-dimensional (3D) printer to generate a preform body including an optical material. The preform body may have a 3D pattern of voids therein defining a 3D lattice. The method may further include drawing the preform body to form the optical fiber device.

26 Claims, 8 Drawing Sheets

(56) References Cited

U.S. PATENT DOCUMENTS

| | | | |
|---|---|---|---|
| 2005/0089670 A1 | 4/2005 | Large et al. | |
| 2014/0056566 A1 | 2/2014 | Guillemette et al. | |
| 2015/0104139 A1 | 4/2015 | Brunet et al. | |
| 2015/0137398 A1 | 5/2015 | Perez | |
| 2015/0197063 A1 | 7/2015 | Shinar et al. | |
| 2016/0281267 A1* | 9/2016 | Wetzel | G02B 6/02314 |
| 2016/0339633 A1 | 11/2016 | Stolyarov et al. | |
| 2017/0163451 A1 | 6/2017 | Willner et al. | |
| 2018/0309183 A1* | 10/2018 | Paolella | H01P 3/20 |

OTHER PUBLICATIONS

Michael Molitch-Hou "First 3d printed fiber optics created by university of sydney researchers with desktop 3d printer" Aug. 6, 2015; https://3dprintingindustry.com/news/author/michael/ pp. 7.

Brunet et al. "Design, fabrication and validation of an OAM fiber supporting 36 states" Optics Express Oct. 20, 2014, vol. 22, No. 21; pp. 12.

Cook et al. "Complex air-structured optical fiber drawn from a 3D-printed preform" Opt. Lett. 40, 3966-3969 (2015).

Michael Kassner "3D printing is helping UK researchers create complex fiber optics" http://www.techrepublic.com/article/3d-printing-is-helping-create-complex-fiber-optics/ Aug. 6, 2015; pp. 3.

U.S. Appl. No. 15/492,317, filed Apr. 20, 2017.

Nenad Bozinovic "Orbital angular momentum in optical fibers" Boston University College of Engineering Dissertation. 2013; pp. 148.

Mao et al. "The Emerging Frontiers and Applications of High-Resolution 3D Printing" Micromachines 2017, 8, 113; www.mdpi.com/journal/micromachines. pp. 20.

Yang et al. "3D printed low-loss THz waveguide based on Kagome photonic crystal structure" Optics Express: vol. 24, No. 20 ; Oct. 3, 2016; pp. 7.

U.S. Appl. No. 15/687,816, filed Aug. 28, 2017.

Cook et al. "Step-index optical fiber drawn from 3D printed preforms" Optics Letters: vol. 41, No. 19, Oct. 1, 2016: pp. 4.

Canning et al. "Drawing optical fibers from three-dimensional printers" Optics Letters: vol. 41, No. 23, Dec. 1, 2016; pp. 4.

\* cited by examiner

METHOD FOR MAKING AN OPTICAL FIBER DEVICE FROM A 3D PRINTED PREFORM BODY AND RELATED STRUCTURES

TECHNICAL FIELD

The present invention relates to the field of communications, and more particularly, to optical fibers and related methods.

BACKGROUND

Fiber-optic communication utilizes optical fibers to transport communication signals which have been modulated to various wavelengths of light. This allows for transmission over longer distances and with higher bandwidths than conventional wire cables, because optical fibers have less signal loss than conventional cables.

Nevertheless, the fabrication of photonic crystal fibers is generally more difficult than traditional optical fibers. Typically, $10^5$ to $10^6$ capillary tubes and solid rods are manually assembled into a preform. The preform is then heated and drawn or pulled into the final optical fiber. This process is typically labor intensive and costly. Moreover, it may be difficult to draw such preforms without inducing defects, which may make the resulting fibers fragile and unsuitable for use at certain optical wavelengths.

Various alternative approaches have been attempted to create optical fibers. In a paper entitled "Complex air-structured optical fiber drawn from a 3D-printed preform" by Cook et al. (Optics Letters, Vol. 40, Issue 17, pp. 3966-3969 (2015)), an alternative approach to making structured fibers is discussed which utilizes a 3D printer to design and print a structured preform that is then drawn to fiber. An FDM printing method was used to print a preform using a transparent thermosetting polymer that is subsequently drawn to fiber. The preform fiber geometry was a solid core surrounded by 6 air holes. A commercially available 3D printing filament was used consisting of a polystyrene mixture containing styrene-butadiene-copolymer and polystyrene.

Despite the existence of such approaches, new techniques for creating optical fibers may be desirable to provide improved robustness, longevity, as well as operation at different optical wavelengths.

SUMMARY

A method for making an optical fiber device may include using a three-dimensional (3D) printer to generate a preform body including an optical material. The preform body may have a 3D pattern of voids therein defining a 3D lattice. The method may further include drawing the preform body to form the optical fiber device.

More particularly, the preform body may include a plurality of strands. By way of example, the strands may be helical strands. In one example embodiment, the strands may be counter-rotating, helical strands. In accordance with another example, the strands may be intersecting, counter-rotating, helical strands.

At least some of the voids may open outwardly along a side of the preform body. Furthermore, drawing may include drawing the preform body while retaining the 3D pattern of voids therein. In addition, the method may also include coating at least a portion of the preform body with a different material prior to drawing. In accordance with another example, the method may further include electroplating at least a portion of the preform body prior to drawing. By way of example, at least a portion of the preform body may be coated with gold.

In one example implementation, the preform body may include a plurality of strands, and at least one of the plurality of strands may comprise a metal. As such, the method may further include passing an electrical current through the at least one metal strand during drawing. By way of example, the metal may comprise tungsten.

In accordance with another example aspect, drawing may include drawing the preform body in a direction offset with respect to an optical axis of the optical fiber device. In another example, drawing may include drawing the preform body in axial and radial directions with respect to an optical axis of the optical fiber device. By way of example, the preform body may include at least one of silica, silicon carbide, and aluminum oxide.

A preform body is also provided. The preform body may include an elongate body to be drawn into a fiber optic device and including an optical material. Furthermore, the elongate body may have a 3D pattern of voids therein defining a 3D lattice.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
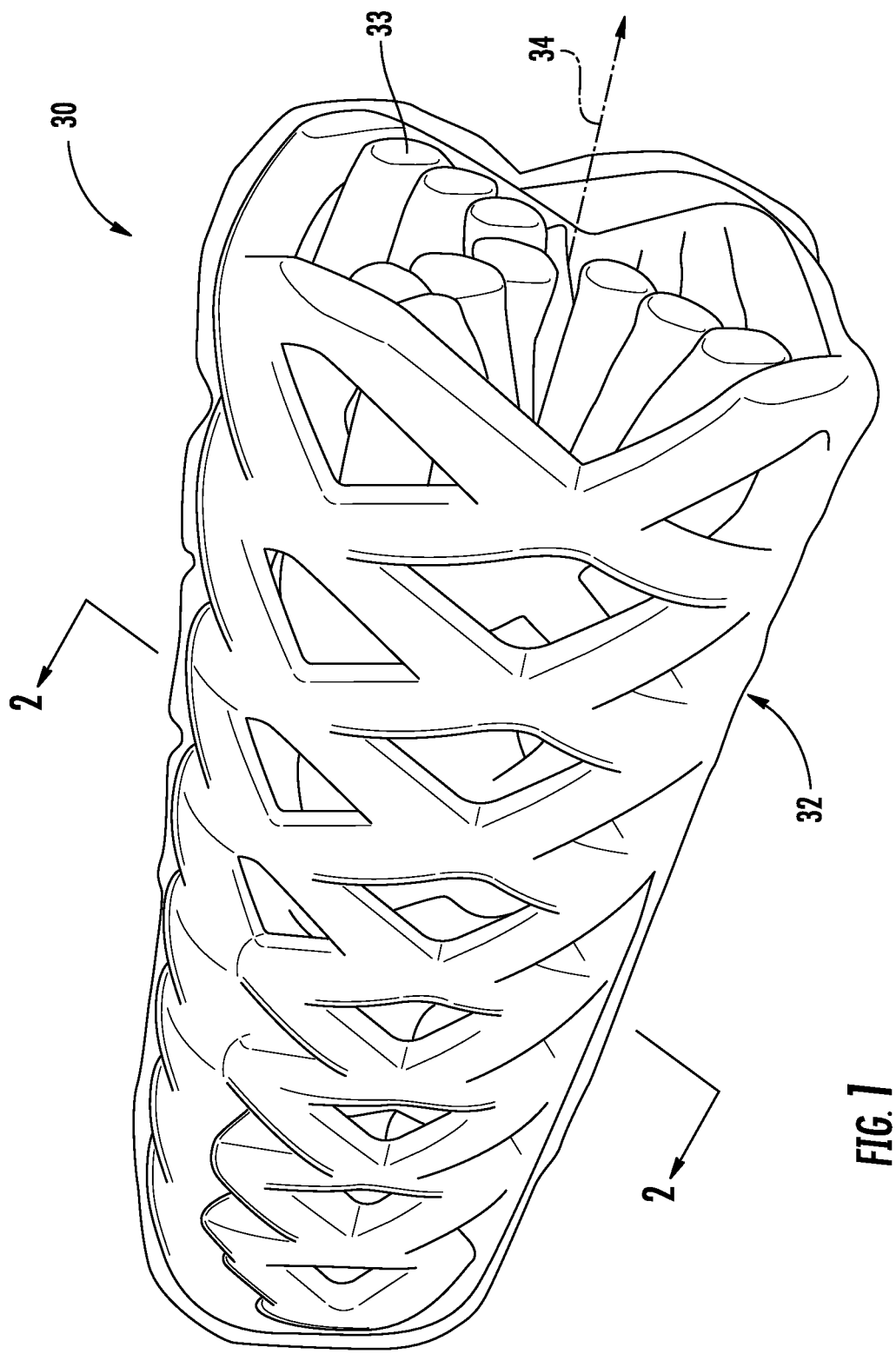
FIG. 1 is a perspective view of a 3D-printed preform body for use in forming an optical fiber device in accordance with an example embodiment.
Figure 2:
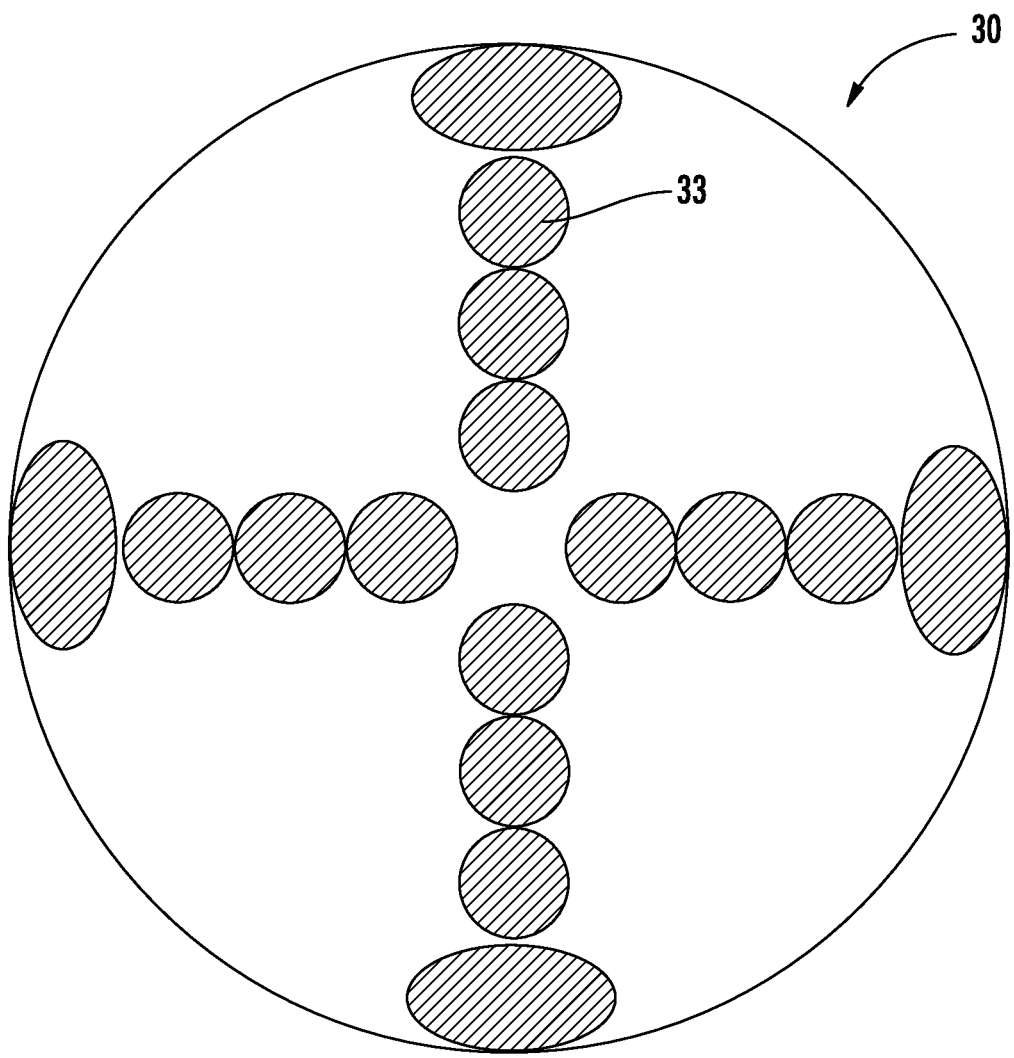
FIG. 2 is a cross-sectional diagram of the preform body of FIG. 1 taken along line 2-2.
Figure 3:
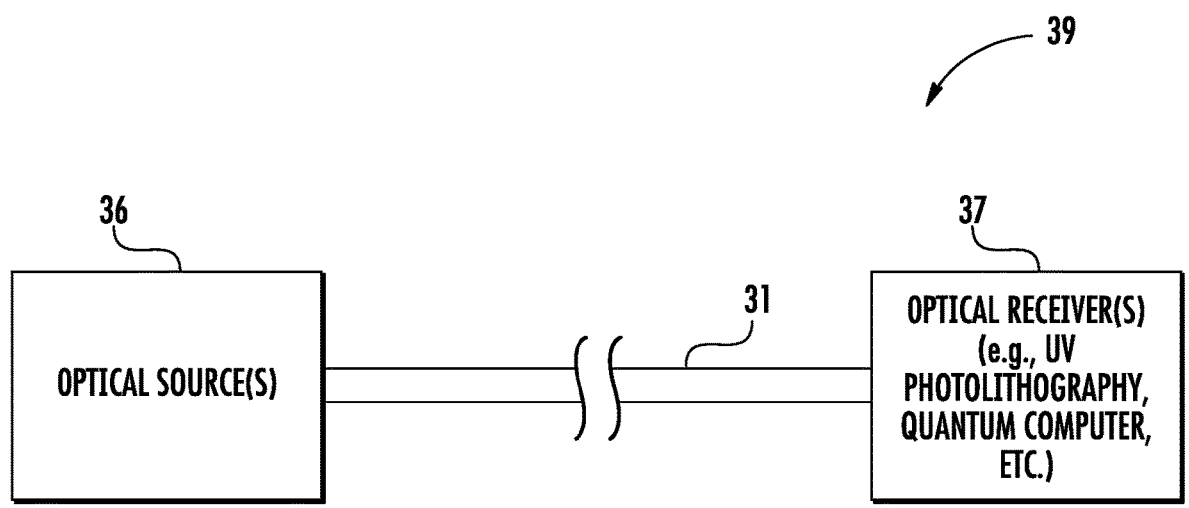
FIG. 3 is a schematic block diagram of a system incorporating an optical fiber device in accordance with an example embodiment.

Referring initially to FIGS. 1-3, a preform body for use in forming an optical fiber device 31 is first described. By way of background, current optical fibers work relatively well for transporting visible light over long distances. However, such optical fibers may be limited in their ability to carry other optical wavelengths, such as ultraviolet (UV) wavelengths, due to the above-described defects in typical optical fibers. That is, while the defects are relatively benign with respect to visible light, the defects interact with UV photons, by way of example the number of UV photons transported all the way through the fiber could be decreased due to the defects, and may cause premature failure in such fibers.

One application where UV fibers are important is in quantum computing. However, current UV fiber technology is problematic in terms of scalability, i.e. transporting photons over km-equivalents with high fidelity. Moreover, UV fibers have undesirably short lifetimes, although they are still important enablers for quantum computing.

Another application where the drawbacks associated with current UV fibers is problematic is UV photolithography, such as for semiconductor device fabrication. In such applications, beam stability is important for reaching the submicron feature sizes needed to continue reducing device sizes along Moore's law. However, a UV source generates a significant amount of heat. However, the associated cooling mechanisms used to dissipate this heat also undesirably transfer resolution-limiting vibrations into the beam forming optics because of the direct connection between the UV source and the optical receiver.

Still another application where the drawbacks of conventional UV fibers becomes apparent is in power-over-fiber applications. Current fiber designs are power limited due to their inability to dissipate thermal energy within the fibers. Yet, conventional copper power cables are generally unacceptable in terms of their size, weight and power (SWaP), as well as their relatively high signal losses.

The preform body 30 may advantageously be generated using a 3D printer with an optical material, such as silicon carbide (as well as siliconized-silicon carbide), borosilicate glass, fused silica, doped glasses, toughened or tempered glasses, and/or aluminum oxide, for example. In some applications, other materials such as polymers or ceramics may be used as well as optical materials.

In the illustrated example, the preform body 30 has a 3D pattern of voids therein defining a 3D lattice. More particularly, the illustrated 3D lattice and voids 32 are defined by a plurality of strands 33 formed out of the optical material (or a plurality of different optical materials in some embodiments). In this example, some of the voids 32 open outwardly along a side of the preform body 30. Furthermore, the optical strands 33 are intersecting and counter-rotating helical strands in the present embodiment, although other geometries may also be used. Moreover, strands need not be used in all embodiments to define the 3D lattice structure.

A communications system 39 is shown in FIG. 3 in which the optical fiber device 31 is coupled between one or more optical sources 36 and one or more optical receivers 37. As noted above, the optical receiver(s) 37 may be associated with a photolithography device, a quantum computing device, or an optical receiver for digital communications or power-over-fiber applications, for example, as will be discussed further below.

Figure 7:
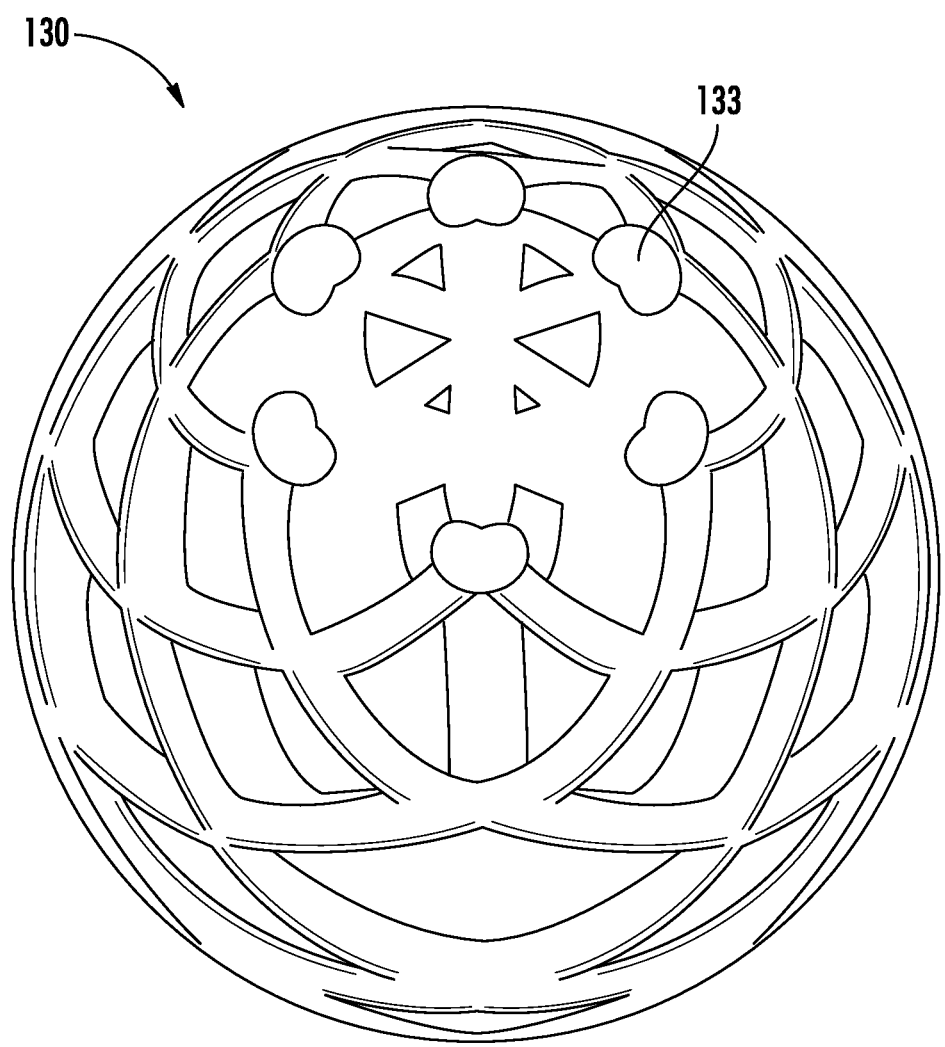
FIG. 7 is a front view of another 3D-printed preform body for use in forming an optical fiber device in accordance with an example embodiment.

By using a 3D-printed preform body 30, desired preform structures may advantageously be fabricated at a scale that is possible with current technology (i.e., current 3D printing technology). This also allows for the use of numerous different shapes in additional to the cylindrical/helical preform body 30, including squares and star shapes (e.g., a five- or six-pointed star). Another example geometry is a spherical preform body 130 seen in FIG. 7 which includes optical strands 133. Such geometries may advantageously provide advantages in communication applications, in that they allow for twisted light pairs, which advantageously increases light transmission to allow for transmission over longer distances. That is, the use of twisted light pairs increases the orbital angular momentum states, which do not interface with one another. Also, by varying the thickness of the strands 33 or portions of the preform body 30, this may also advantageously twist the light, allowing a large number of twisted beams to be transported down the same fiber, as will be appreciated by those skilled in the art.

Current optical fibers are typically aperiodic. Using the preform body 30, an optical fiber 31 may be created which is periodic, or which has a single pitch in the same direction, enabling the creation of twisted light.

In addition to providing for twisted light beams, the optical fiber 31 also advantageously allows for summed and difference beam outputs. Respective optical sources 36 may be coupled to respective strands 33 within the optical fiber 31 in some embodiments. In other embodiments, some of the optical strands 33 may not have an optical source 36 coupled to them. That is, light may be sent down each of the optical strands 33, or down only selective ones of the optical strands. This may advantageously be used to modulate the phase, amplitude, polarization and/or differences between light beams, depending on the configuration used. Furthermore, adjusting the thicknesses of the strands 33 and their respective pitches may advantageously be used to adjust the mode field of the optical fiber device 31 to make a large effective fiber, as will be appreciated by those skilled in the art.

Figure 4:
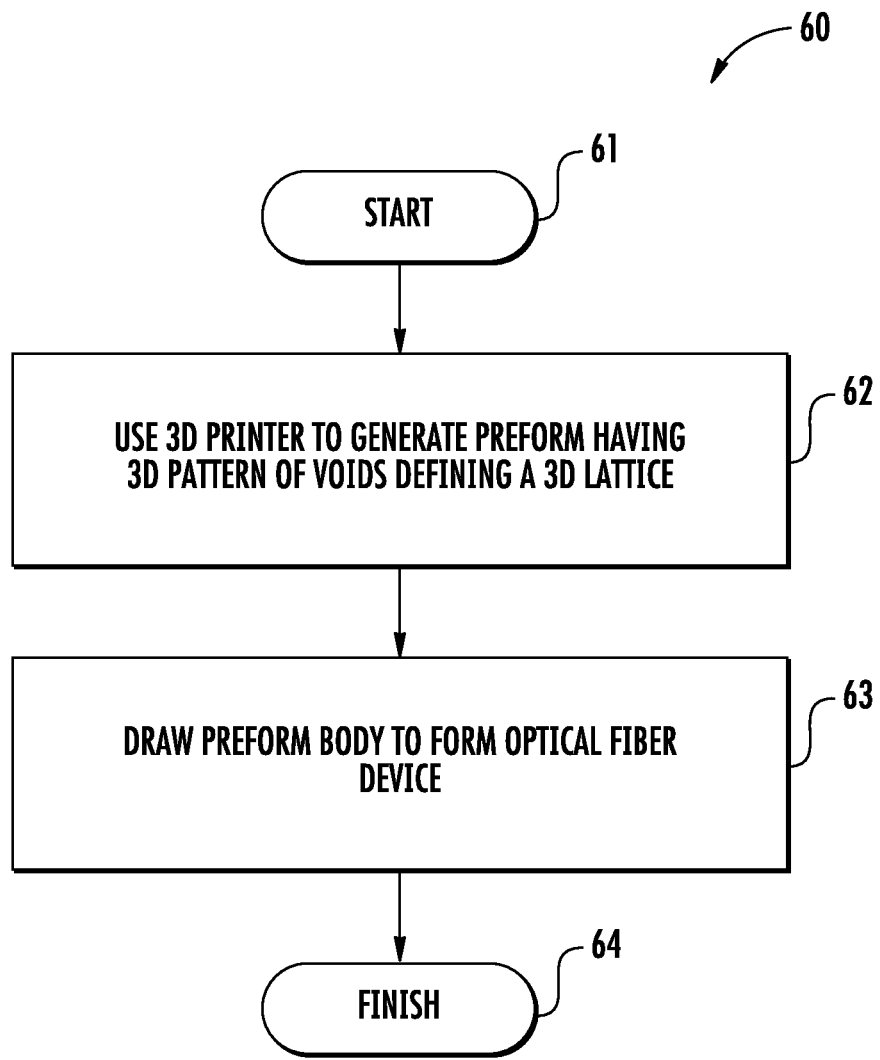
FIGS. 4 and 5 are flow diagrams illustrating methods for making an optical fiber device in accordance with example embodiments.
Figure 5:
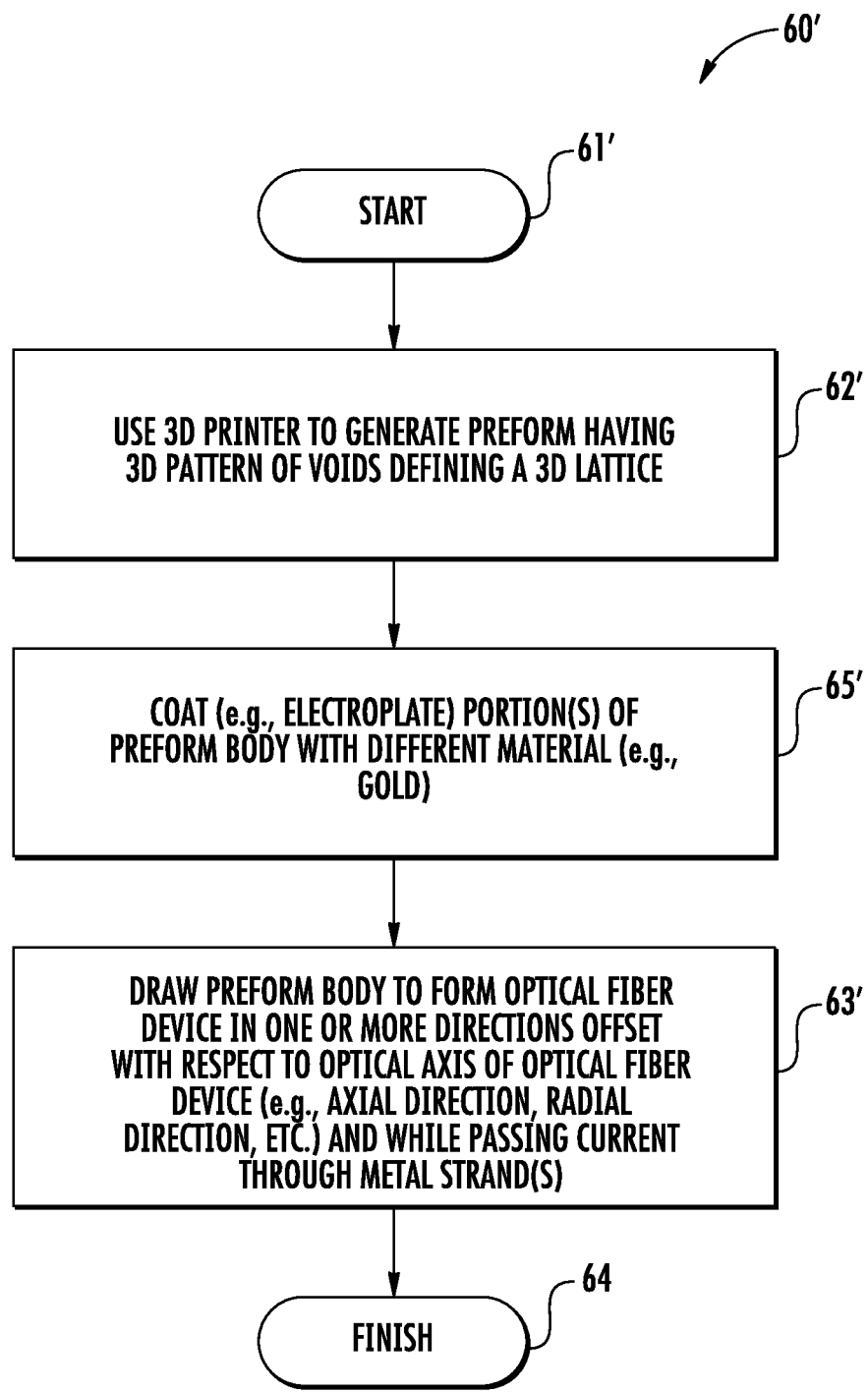

Referring additionally to the flow diagrams 60, 60' of FIGS. 4 and 5, a method for making an optical fiber device 31 from the preform body 30 is now described. Beginning at Block 61 (or Block 61'), the process begins with using a 3D printer to generate the preform body 30 having a 3D pattern of voids defining a 3D lattice therein, as discussed above, at Block 61 (or Block 61'). The method further illustratively includes drawing the preform body to form the optical fiber device 31, at Block 63 (or Block 63'), as will be discussed further below.

In the example embodiment illustrated in FIG. 5, a further step of coating one or more portions of the preform body 30 with a different material than the optical material is performed prior to drawing, at Block 65'. In accordance with one example implementation, the method may further include electroplating at least a portion of the preform body 30 prior to drawing with a material that will pull with the preform body during drawing. By way of example, gold (Au) stretches well and may accordingly be applied (e.g., by electroplating) as a "cladding" before pulling. One advantage of this approach is that an electric field may be applied through the gold (or other suitable metal) during the pulling process. Furthermore, different strands may be selectively coated to change the polarization, etc., of the optical fiber 31. For example, coating every other optical strand may provide an oscillating polarization. Sputtering is another way to coat selective areas of the preform body 30, which will change the total internal reflection/intensity in these areas. It should be noted that in some embodiments a coating or cladding may instead (or additionally) be applied to the optical fiber 31 after it is drawn. The methods of FIGS. 4 and 5 illustratively conclude at Blocks 64, 64'.

Figure 8:
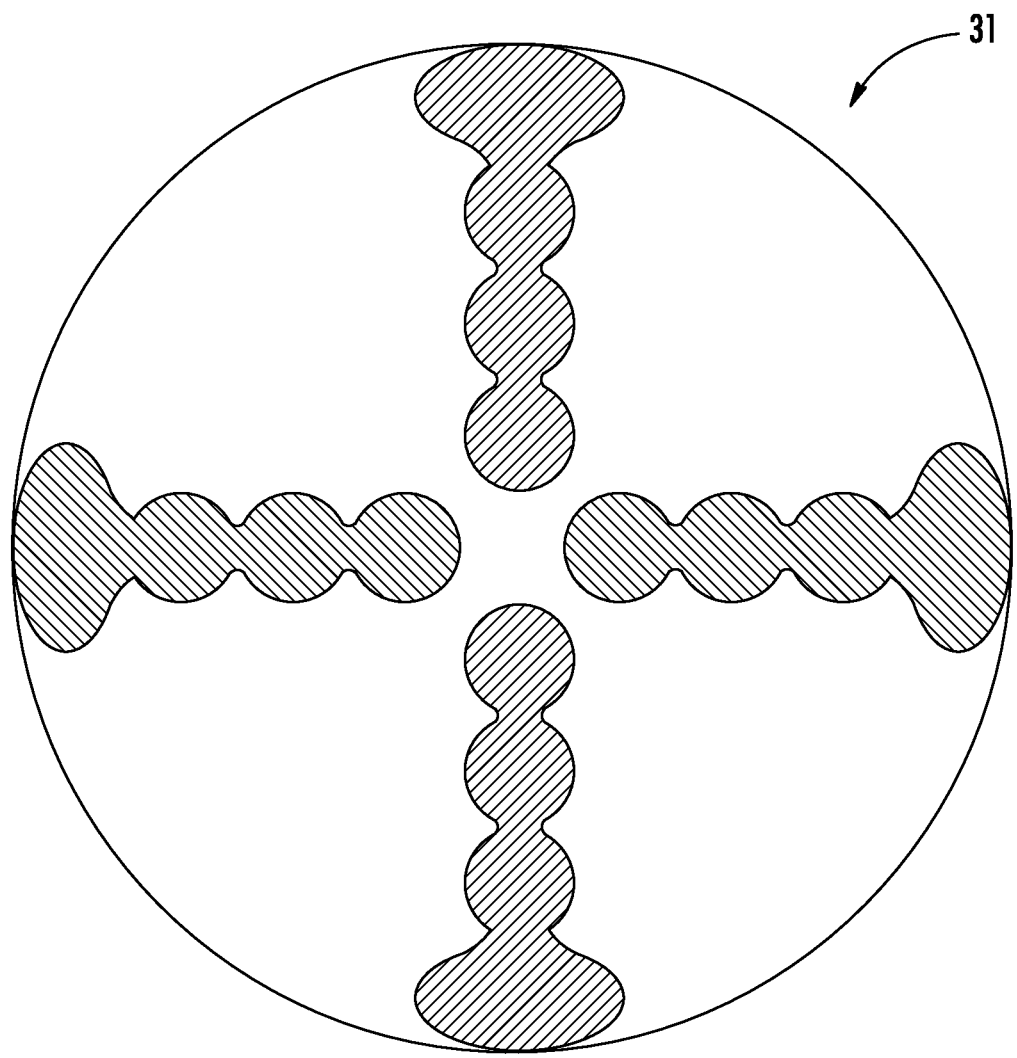
FIG. 8 is a cross-sectional diagram of the optical fiber device of FIG. 3.

Generally speaking, the preform body 30 will be drawn in such a way as to retain the 3D pattern of voids therein in the final optical fiber device. That is, while the cross-sectional dimensions of the preform body 30 will change as it is drawn down into the much thinner optical fiber device 31, the general shape or geometry of the lattice and voids 32 may be preserved although greatly elongated. A cross-sectional view of the optical fiber device 31 is shown in FIG. 8. It should be noted that in other embodiments, preforms may be used which do not resemble the final drawn structure. For example, a process similar to an expanded metal (exmet) process may be used in which the final drawn fiber does not resemble the preform.

In some embodiments, the preform body 30 may be drawn along an optical axis 34 of the preform body 30 (FIG. 1). However, one particular advantage of using a 3D-printed preform body 30 is that this allows for different types of pulls or drawing than are possible with conventional fiber preforms. That is, in some embodiments the preform body 30 may be drawn in a direction offset with respect to the optical axis 34 of the preform body 30 or optical fiber 31. In another example, the preform body 30 may be drawn in both axial and radial directions with respect to the optical axis 34. By way of example, the preform body 30 may have a size in a range of about 1 to 2 feet in length, and an outer diameter in a range of 1 to 2 inches, although other dimensions may be used in different embodiments. Such a preform body 30 may be drawn down to an optical fiber 31 of a kilometer in length or more in some embodiments.

Figure 6:
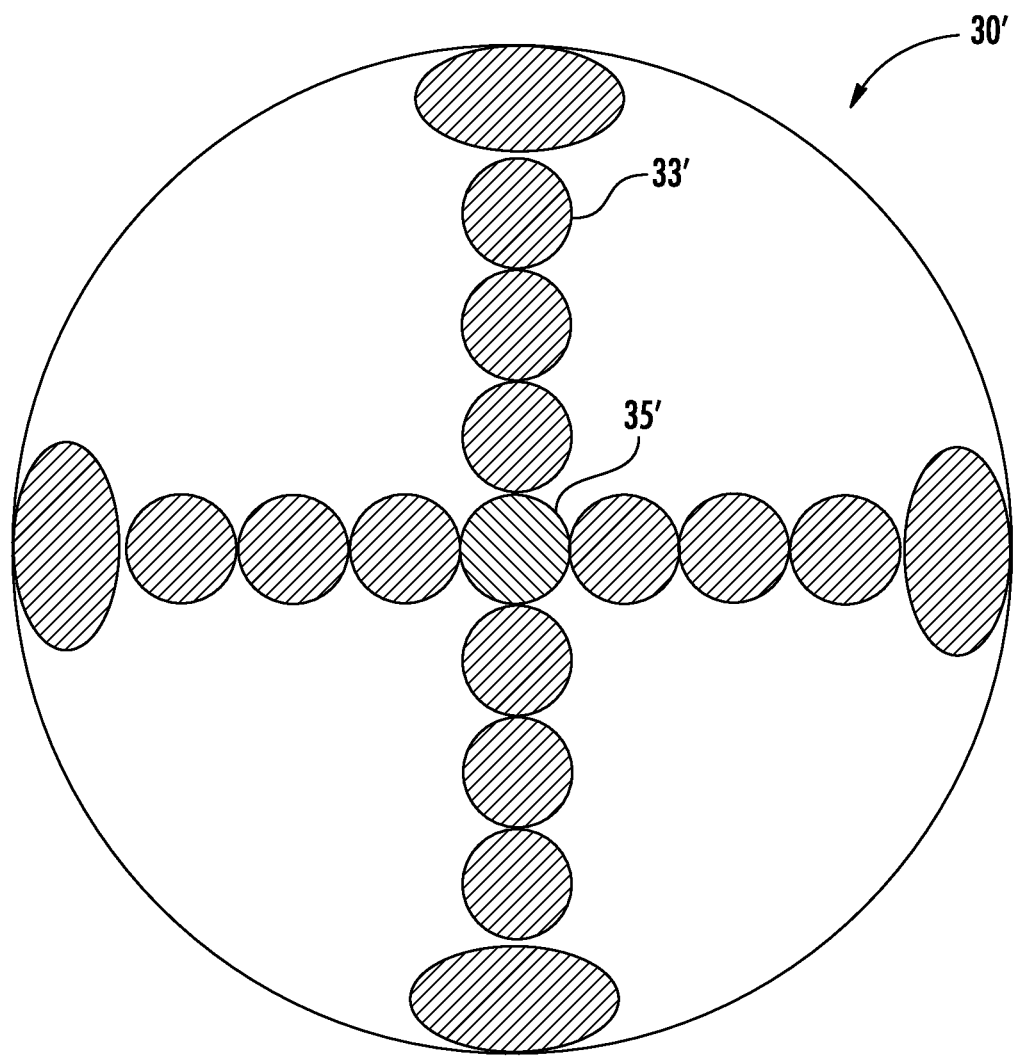
FIG. 6 is a cross-sectional diagram of another embodiment of the preform body of FIG. 2.

Referring additionally to FIG. 6, in another example implementation of the preform body 30', a conductive (e.g., metal) strand 35' is incorporated along with the optical strands 33'. That is, one or more metal strands 35' are printed by the 3D printer along with the optical strands 33'. In the illustrated example, there is a single metal strand 35' which runs down the middle (i.e., along the optical axis) of the preform body 30', although the position of the metal strand(s) 35' may be different in different embodiments. The metal strand(s) 35' may also take the same shape as the optical strands 33' (e.g., helical). Moreover, in some embodiments strands do not have to be used in forming the preform body 30'. That is, it may be a solid or semi-solid body with metal traces extending therethrough like a via. One example material which may be used for the strands 35' is tungsten, although other suitable conductive materials may be used in different embodiments.

Including one or more conductive strands 35' in the preform body 30' provides certain advantages. One is that this allows for the creation of an electric field in the optical fiber device 31' that can affect light photons as desired. Another advantage is that conductive strands 35' may advantageously be used to heat the preform body 30' from the inside during the drawing process (Block 63'), in addition to (or instead of) from the outside. That is, typical optical fiber preforms are simply heated from the outside and drawn into the final fiber shape. Yet, the preform body 30' with the conductive strand(s) 35' (or other conductive material arrangement within the preform body) advantageously allows for more uniform or even heating during drawing, and this uniform thermal gradient may advantageously result in a significant reduction in defects during the drawing process.

It should be noted that the cross-section of the preform body 30' changes as it is drawn. As a result, in those embodiments which incorporate one or more conductive strands 33' to which a current is applied during the drawing process, the current applied may be scaled accordingly to account for the increased resistance of the conductive strand and avoid excessive heat.

Because the optical fibers 33 made in accordance with the present disclosure may have less defects and are able to transport UV light over longer distances and with a longer service life, this may advantageously allow the optical (UV) source(s) 36 to be positioned farther away from the receiver(s) 37 in applications such as photolithography. As a result, the optical receiver(s) 37 will advantageously be subjected to less of the heat and vibration associated with the source(s) 36, as discussed above.

For UV fibers, it is generally desirable to limit the amount of interaction between the UV light and glass, as the UV light breaks down such materials over time. As such, in some embodiments hollow core optical strands 33 may be used to provide less surface area for the UV light to interact with the optical material.

It should be noted that while the above examples discuss the use of the optical fiber 31 for UV applications, the optical fibers created in accordance with the techniques described herein may advantageously be used for different optical wavelengths and spectrums including visible light, millimeter wave, X-ray, and THz wavelengths, for example. Accordingly, the optical fiber device 31 may advantageously be used to relatively inexpensively transport photons over many thousands of wavelengths with fully customizable propagation characteristics.

The above-described approach advantageously harnesses the power of additive manufacturing to enable new uses and applications for optical fiber devices providing enhanced performance and robustness. For example, this allows for the manufacture of UV fibers with significantly longer lifetimes than are currently unattainable with conventional approaches. More particularly, the 3D-printed complex structures may advantageously enable photon guiding/interaction with a broader range of output photon beam properties, and in applications where current optical fibers are unsuitable. Moreover, this approach also enables the fabrication of previously impossible/unexplored 2D and 3D geometries.

As noted above, the approach described herein allows for 3D-printing of complex structures from one or more materials that undergo zero to multiple post-processing steps to produce a device that enables broadband (UV to microwave) photons to interact with each other and/or be guided over several thousand wavelengths to a remote location. Furthermore, additively manufacturing glass preforms, instead of manual assembly from solid or hollow capillaries, advantageously enables for the use of multiple different materials inside complex structures Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A method for making an optical fiber device comprising:
    using a three-dimensional (3D) printer to generate a preform body comprising an optical material, the preform body comprising a plurality of strands, wherein the plurality of strands comprises a plurality of helical strands, and having a 3D pattern of voids therein defining a 3D lattice; and
    drawing the preform body to form the optical fiber device.

2. The method of claim 1 wherein the plurality of strands comprises a plurality of counter-rotating, helical strands.

3. The method of claim 1 wherein the plurality of strands comprises a plurality of intersecting, counter-rotating, helical strands.

4. The method of claim 1 wherein drawing comprises drawing the preform body while retaining the 3D pattern of voids therein.

5. The method of claim 1 further comprising coating at least a portion of the preform body with a different material prior to drawing.

6. The method of claim 1 further comprising electroplating at least a portion of the preform body prior to drawing.

7. The method of claim 6 wherein electroplating comprises electroplating with gold.

8. The method of claim 1 wherein at least one of the plurality of strands comprises a metal.

9. The method of claim 8 further comprising passing an electrical current through the at least one of the plurality of strands comprising metal during drawing.

10. The method of claim 9 wherein the metal comprises tungsten.

11. The method of claim 1 wherein drawing comprises drawing the preform body in a direction offset with respect to an optical axis of the optical fiber device.

12. The method of claim 1 wherein drawing comprises drawing the preform body in axial and radial directions with respect to an optical axis of the optical fiber device.

13. The method of claim 1 wherein the preform body comprises at least one of silicon carbide and aluminum oxide.

14. A method for making an optical fiber device comprising:
using a three-dimensional (3D) printer to generate a preform body comprising a plurality of strands, the plurality of strands comprising an optical material and defining a 3D lattice with a 3D pattern of voids therein, and at least some of the voids opening outwardly along a side of the preform body; and
drawing the preform body to form the optical fiber device.

15. The method of claim 14 wherein the plurality of strands comprises a plurality of helical strands.

16. The method of claim 14 wherein drawing comprises drawing the preform body while retaining the 3D pattern of voids therein.

17. The method of claim 14 further comprising coating at least a portion of the preform body with a different material prior to drawing.

18. The method of claim 14 further comprising electroplating at least a portion of the preform body prior to drawing.

19. The method of claim 14 wherein the preform body further comprises at least one metal strand.

20. The method of claim 19 further comprising passing an electrical current through the at least one metal strand during drawing.

21. The method of claim 14 wherein drawing comprises drawing the preform body in a direction offset with respect to an optical axis of the optical fiber device.

22. The method of claim 14 wherein drawing comprises drawing the preform body in axial and radial directions with respect to an optical axis of the optical fiber device.

23. A method for making an optical fiber device comprising:
using a three-dimensional (3D) printer to generate a preform body comprising an optical material, the preform body having a 3D pattern of voids therein defining a 3D lattice;
coating at least a portion of the preform body; and
drawing the preform body after coating to form the optical fiber device.

24. The method of claim 23 wherein coating at least a portion of the preform body comprises electroplating at least a portion of the preform body.

25. The method of claim 24 wherein electroplating comprises electroplating with gold.

26. A method for making an optical fiber device comprising:
using a three-dimensional (3D) printer to generate a preform body comprising an optical material, the preform body having a 3D pattern of voids therein defining a 3D lattice; and
drawing the preform body to form the optical fiber device in a direction offset with respect to an optical axis of the optical fiber device.

* * * * *